United States Patent [19]

Yabunaka

[11] Patent Number: 4,613,761
[45] Date of Patent: Sep. 23, 1986

[54] STARTER DYNAMO

[75] Inventor: Kiyoshi Yabunaka, Himeji, Japan

[73] Assignee: Mitsubishi Denki Kabushiki Kaisha, Tokyo, Japan

[21] Appl. No.: 662,155

[22] Filed: Oct. 18, 1984

[30] Foreign Application Priority Data

Oct. 18, 1983 [JP] Japan ............................ 58-162254[U]

[51] Int. Cl.$^4$ ............................................. F02N 11/04
[52] U.S. Cl. .................................... 290/36 R; 290/47; 310/153
[58] Field of Search ...................... 290/27, 36 R, 38 R, 290/47, 48; 310/112, 113, 152, 153

[56] References Cited

U.S. PATENT DOCUMENTS

| 1,194,607 | 8/1916 | Duca et al. | 290/36 R |
| 1,375,319 | 4/1921 | Rae | 290/36 R |
| 1,620,747 | 3/1927 | Allison | 290/47 |
| 1,734,955 | 11/1929 | Aspden | 290/47 |
| 2,061,245 | 11/1936 | Nowosielski | 123/179 |
| 2,451,767 | 10/1948 | Nardone | 74/6 |
| 2,753,490 | 7/1956 | Smits | 310/153 X |
| 4,019,485 | 4/1977 | Carlsson | 310/153 X |
| 4,227,105 | 10/1980 | Kumakura | 310/153 |

FOREIGN PATENT DOCUMENTS 0021881 1/1981 European Pat. Off. .

Primary Examiner—William M. Shoop, Jr.
Assistant Examiner—W. E. Duncanson, Jr.
Attorney, Agent, or Firm—Oblon, Fisher, Spivak, McClelland & Maier

[57] ABSTRACT

A starter dynamo comprises a d.c. motor having a hollow armature rotary shaft, a rotary output shaft passing through the hollow armature rotary shaft and connected to the armature rotary shaft through a one-way clutch, a transmission mechanism provided at one end of the rotary output shaft to keep connection of the rotary output shaft to a crank shaft of an engine for revolution, and a generator provided with a flywheel magnet disposed at the other end of the rotary output shaft.

1 Claim, 3 Drawing Figures

STARTER DYNAMO

BACKGROUND OF THE INVENTION

The present invention relates to a starter dynamo. More particularly, it relates to an improvement in a starter dynamo used, for instance, for automobiles.

A dynamo is connected to an output shaft of an engine to perform starting of the engine and generation of electricity. A dynamo generally used is constructed as shown in FIGS. 1 and 2. In the Figures, a reference numeral 1 designates a flywheel magnet comprising a flywheel 4 firmly connected to an end of a crank shaft 3 which is provided in an engine 2. A numeral 5 designates an armature screw-fitted to a part of the engine 2, the armature being constitued by an armature core 6 and a coil 7 for lighting and charging, wound around the armature core 6. The flywheel 4 includes pieces of magnetic steel 8 and pole cores 9 which are fixed into one body in an aluminum die-cast body 10. A numeral 11 designates a bearing mounted on a part of the engine 2 to support the crank shaft 3 in a freely rotatable manner. A numeral 12 designates a diode which rectifies an a.c. power output produced in the coil 7 to supply it to a battery 13, a numeral 14a designates a switch connecting a terminal of the coil 6 to the anode of the diode 12 by switching an intermediate tap and a numeral 14b designates a switch which is operated in association with the switch 14a and supplies the a.c. power output produced in the coil 7 to lamp 15 mounted on an automobile.

In the dynamo constructed as above-mentioned, actuation of the engine rotates the crank shaft 3 and the flywheel 4 connected to the crank shaft 3 is rotated. When the flywheel 4 is rotated, a rotating magnetic field produced by the pieces of magnetic steel 8 provided in the flywheel 4 acts on the armature 5 thereby generating an electormotive force of an alternating current in the coil 7. The electromotive force of the alternating current is applied through the switch 14a to the diode 12 where it is subjected to rectification and the rectified current is charged in the battery 13. Otherwise, the electromotive force of alternating current is applied to the lamp 15 througth the switch 14b operated in association with the switch 14a to operate the lamp.

The conventional device has, however, a disadvantage of a complicated structure of the device because it is necessary to install a starting device for the engine separately. To solve such problem, there has been proposed a starter dynamo in which a charging generator and a d.c. motor having function of a starter motor are connected to a crank shaft. The proposed starter dynamo had still another disadvantage that the life time is extremely short because as the revolution of the engine increases, the starter dynamo is also rotated at a high speed.

SUMMARY OF THE INVENTION

It is an object of the present invention is to solve problems in the above-mentioned conventional starter dynamo and to provide a starter dynamo durable to a high revolutional speed.

The present invention also has as its object to provide a starter dynamo which comprises a d.c. motor having a hollow armature rotary shaft, a rotary output shaft passing through the hollow armature rotary shaft and connected to the armature rotary shaft through a one-way clutch, a transmission mechanism provided at one end of the rotary output shaft to keep connection of the rotary output shaft to a crank shaft of an engine for revolution, and a generator provided with a flywheel magnet disposed at the other end of the rotary output shaft.

BRIEF DESCRIPTION OF THE DRAWINGS

The foregoing objects, other objects as well as specific construction and operation of the starter dynamo according to the present invention will become more apparent and understandable from the following description of it, when read in conjunction with the accompanying drawings in which.

DETAILED DESCRIPTION OF THE PREFERRED EMBODIMENTS

An embodiment of the present invention will be described with reference to drawing.

Figure 1:
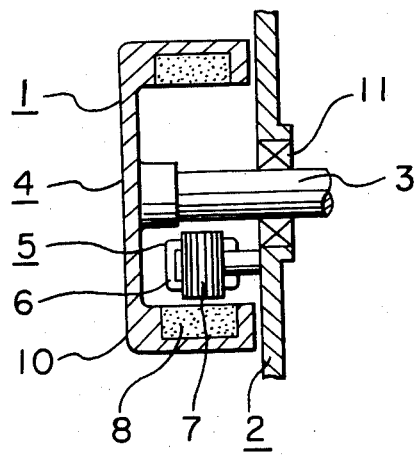
FIG. 1 is a cross-sectional view of an important part of a conventional dynamo.
Figure 2:
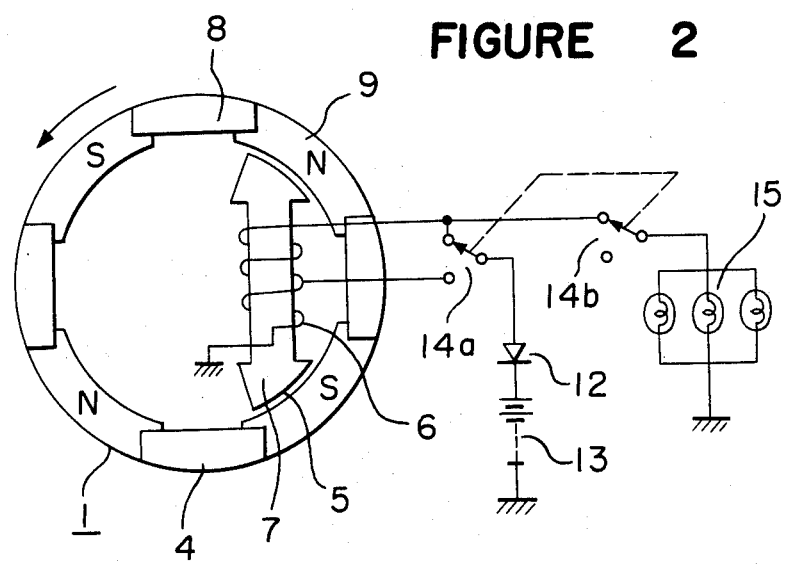
FIG. 2 is a circuit diagram showing the electric system of the dynamo shown in FIG. 1.
Figure 3:
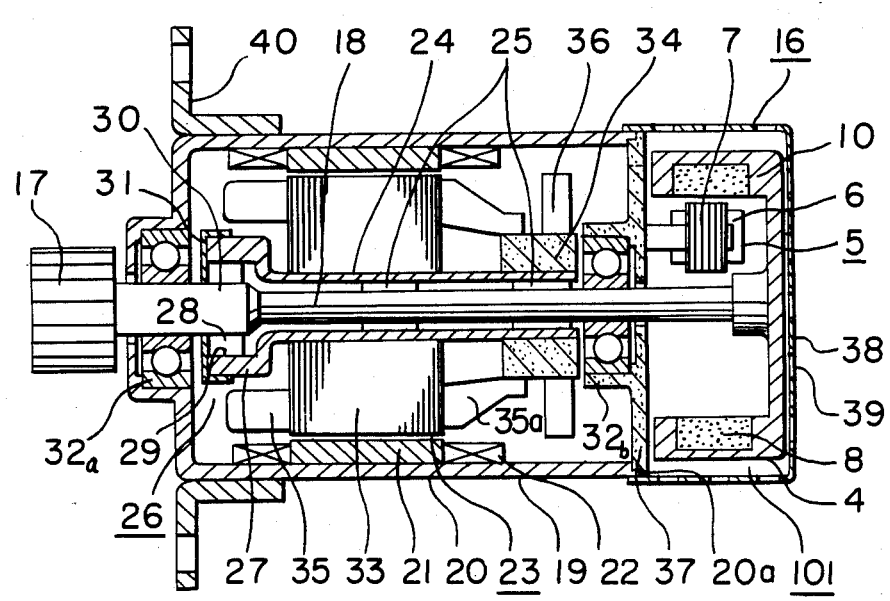
FIG. 3 is view of an embodiment of the starter dynamo according to the present invention.

FIG. 3 is a cross-sectional view of an important part of an embodiment of the starter dynamo according to the present invention in which the same reference numerals as in FIG. 1 designates the same parts. In the Figure, a reference numeral 16 designates a starter dynamo which is constituted by a d.c. motor 19 through which extends a rotary shaft 18 at the front end of which a pinion 17 is firmly connected and a flywheel magnet 101 attached to the rear end of the rotary shaft 18. A numeral 20 designates a bracket which is formed by deep-drawing a soft steel sheet by a pressing machine. On the inner circumferential surface of the bracket, magnetic poles 21 are secured and field magnet coils 22 are respectively wound on the magnetic poles 21. A numeral 23 designates an armature and a numeral 24 designates a hollow rotary shaft of the armature 23. Sleeve bearings 25 are fitted to the inner circumferential surface of the hollow rotary shaft 24 so that the armature is rotatably supported by the reduced diameter portion of the rotary shaft 18 through the sleeve bearings 25. A numeral 26 designates an overrunning clutch and an clutch outer member 27 is connected integrally with the rotary shaft 24 of the armature. A numeral 28 designates friction rollers which are fitted in a wedge-like space formed between a cam surface 29 in the inner circumferential surface of the clutch outer member 27 in a tubular form and a precisely finished surface 30 formed in the outer circumferential surface of the enlarged diameter portion of the rotary shaft 18 so as to engage with a narrowed portion of the wedge-like space, whereby a rotational force of the rotary shaft 24 is transmitted through the clutch outer member 27 to the pinion 17 in only one direction. A numeral 31 designates a cover, a numeral 32a designates a first ball bearing fitted to the inner circumferential surface of a projecting part at the front of the frame 20, the first ball bearing 32a supporting the rotary shaft 18 in a freely rotatable manner, a numeral 33 designates an armature core mounted on the outer periphery of the rotary shaft 24 and around the small diameter portion of shaft 18, a numeral 34 designates a rectifier to which each end of lead wires 35a of armature coils 35 received in slots (not shown) formed in the armature iron core 33 is connected. A numeral 36 designates brushes and a numeral 40 designates a bracket firmly connected to the frame 20 by welding. The starter dynamo 16 is screw-fitted to an engine (not shown). A numeral 37 designates a rear frame which is fitted by screw to an annular step portion 20a formed in the rear opening part of the frame 20. A second ball bearing 32b for rotatably supporting the rear part of the rotary shaft 18 and an armature 5 of a flywheel magnet 101 are attached to the rear frame by screws. A numeral 38 designates a cover for a flywheel 4 in which a number of holes 39 for dissipating heat are formed.

In the starter dynamo constructed as above-mentioned, when the field coils 22 and the armature 23 of the d.c. motor 19 are in conductive state, the rotary shaft 24 starts turning and a rotational force is transmitted to the pinion 17 through the overrunning clutch 26 whereby a ring gear (not shown) is brought into engagement with the pinion 17 to be rotated. The rotational force rotates the crank shaft (not shown) thereby starting the engine by the cranking movement of the crank shaft. When the engine is started, the pinion 17 is conversely energized by the ring gear attached to the crank shaft. However, the rotational force is not transmitted to the armature 23 by the action of the overrunning clutch 26 and the armature 23 is caused to freely rotate without any load. The armature 23 is stopped due to a frictional force produced between brushes 36 and the armature 34 when current conduction to the d.c. motor 19 is stopped. During the revolution of the engine, the flywheel 4 of the flywheel magnet 101 is rotated by the rotary shaft 18 and generation of current is performed as in the device shown in FIG. 1. Accordingly, the flywheel 4 is durable to a high revolutional speed and a starter dynamo actuated at a high revolution speed can be obtained. Moreover, since only a relatively small torque is delivered through the output shaft 18 to the flywheel body 4 (as compared to the starter torque), the diameter of the shaft 18 is reduced, resulting in a more compact device.

In the embodiment as described above, the rotary shaft 18 of the starter dynamo is connected to an engine by means of the pinion 17. The same effect can be attained by using a belt transmission system comprising a timing belt wheel or a V-belt wheel or a chain transmission system. For the bearing used for the device of the present invention, it is desirable to use a bearing durable to a high revolution speed, such as a magnetic bearing or a fluid bearing using air or another fluid.

As described above, the starter dynamo according to the present invention is to prevent reverse actuation caused by the output of an engine by constructing the starter dynamo in such a manner that a rotary shaft is extended to the rear part of the d.c. motor by passing through a hollow rotary shaft of the armature; a flywheel magnet of a generator is attached to the rotary shaft and a one-way clutch is interposed between the d.c. motor and the rotary shaft. Accordingly, a small sized and highly reliable starter dynamo can be easily obtained.

I claim:

1. A starter dynamo comprising:
a rotatable output shaft having an enlarged diameter portion at one end thereof and a reduced diameter portion along the remainder thereof;
rotational power transmission means at said one end of said shaft;
a D.C. motor having an armature mounted on a hollow armature rotary shaft mounted coaxially around said output shaft, with said armature mounted coaxially around said reduced diameter portion of said output shaft;
one way clutch means for rotatably connecting said hollow shaft to said enlarged diameter portion of said output shaft in one rotational direction; and
a generator provided with a flywheel magnet fixed to another end of said output shaft and axially spaced from said D.C. motor,
whereby the diameter of said D.C. motor is reduced.

* * * * *